May 21, 1963 W. LORENZ 3,090,056
PRESSURE PAD ASSEMBLY FOR SHOE PRESS
Filed April 20, 1961 16 Sheets-Sheet 3

INVENTOR
WERNER LORENZ
BY Dicke, Craig & Freudenberg
ATTORNEY

INVENTOR
WERNER LORENZ
ATTORNEYS

May 21, 1963 W. LORENZ 3,090,056
PRESSURE PAD ASSEMBLY FOR SHOE PRESS
Filed April 20, 1961 16 Sheets-Sheet 5

INVENTOR
WERNER LORENZ
BY Dike, Craig & Freudenberg
ATTORNEYS

May 21, 1963  W. LORENZ  3,090,056
PRESSURE PAD ASSEMBLY FOR SHOE PRESS
Filed April 20, 1961  16 Sheets-Sheet 6

INVENTOR
WERNER LORENZ
BY Dicke, Craig & Freudenberg
ATTORNEYS

May 21, 1963 W. LORENZ 3,090,056
PRESSURE PAD ASSEMBLY FOR SHOE PRESS
Filed April 20, 1961 16 Sheets-Sheet 8
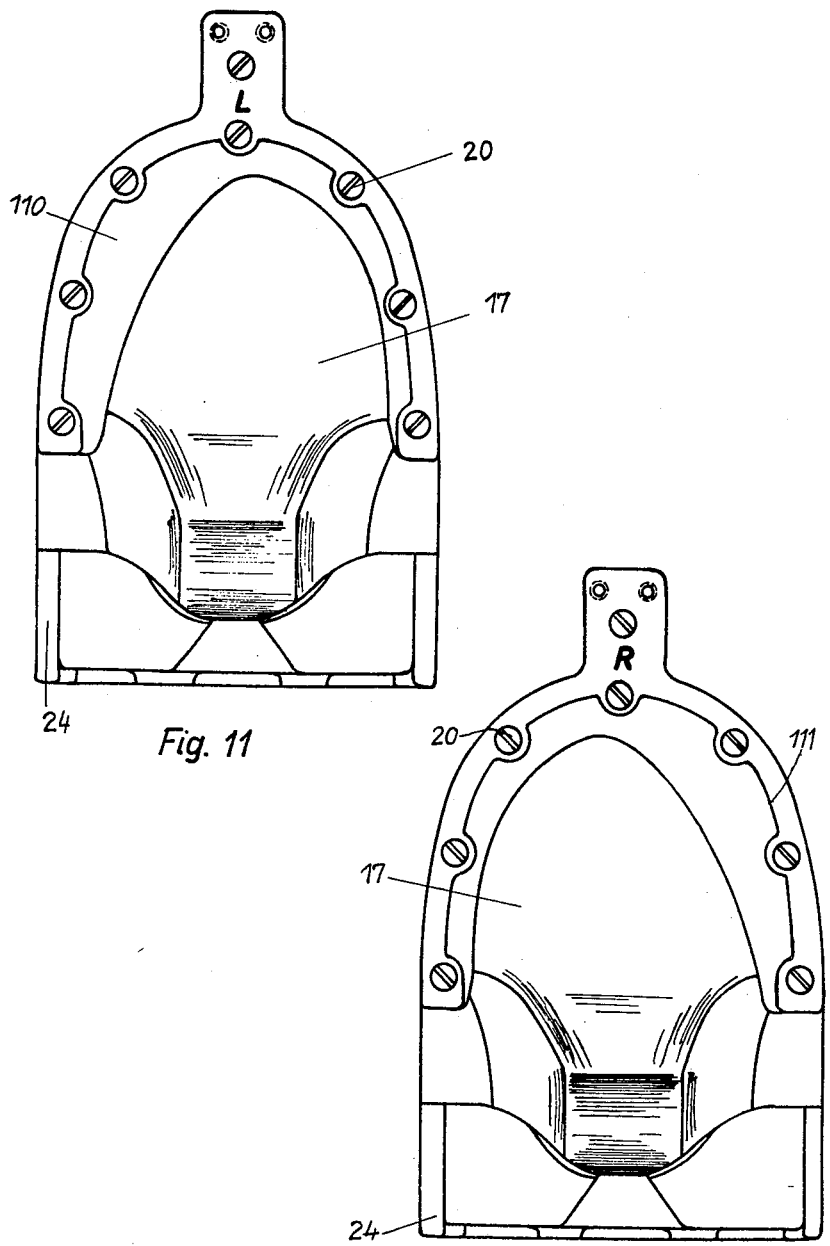

May 21, 1963 W. LORENZ 3,090,056
PRESSURE PAD ASSEMBLY FOR SHOE PRESS
Filed April 20, 1961 16 Sheets-Sheet 10

INVENTOR
WERNER LORENZ
BY Dicke, Craig & Freudenberg
ATTORNEYS

May 21, 1963
W. LORENZ
3,090,056
PRESSURE PAD ASSEMBLY FOR SHOE PRESS
Filed April 20, 1961
16 Sheets-Sheet 11
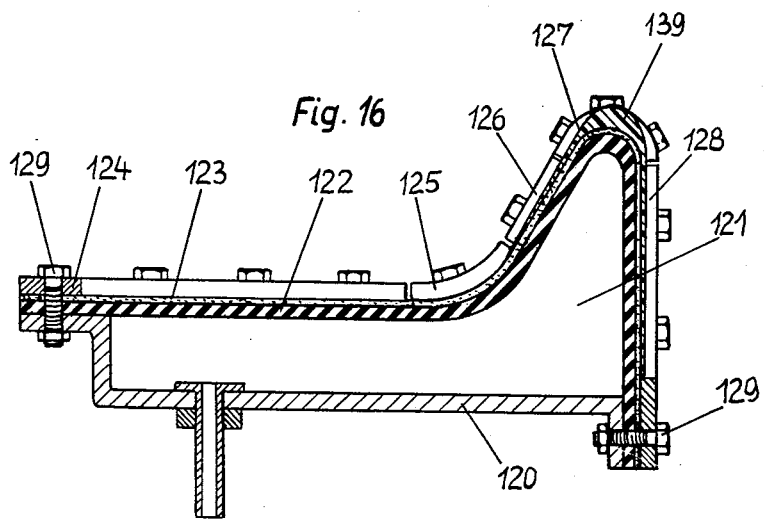
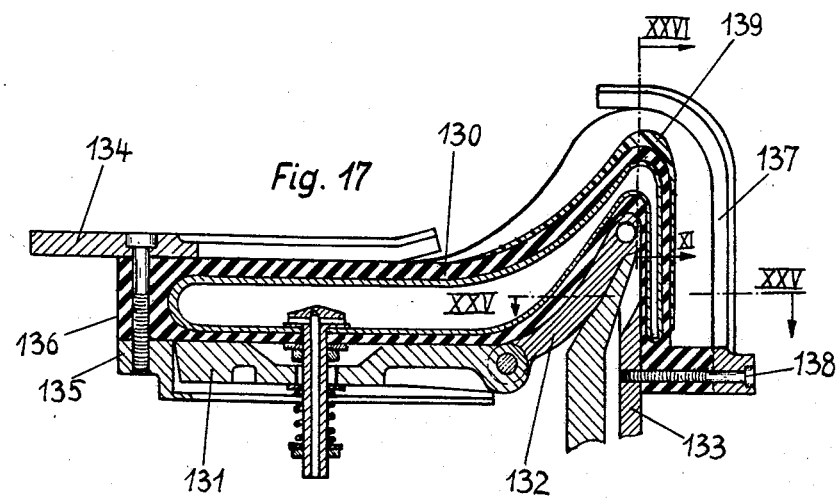
INVENTOR
WERNER LORENZ
ATTORNEYS May 21, 1963  W. LORENZ  3,090,056
PRESSURE PAD ASSEMBLY FOR SHOE PRESS
Filed April 20, 1961  16 Sheets-Sheet 12
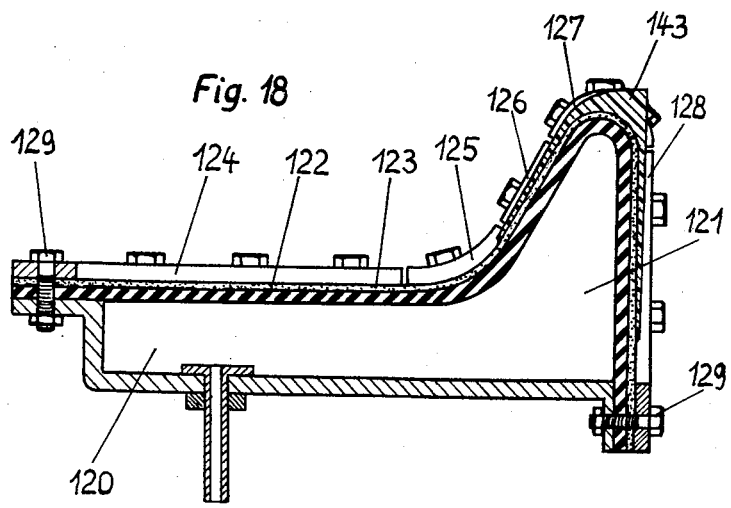
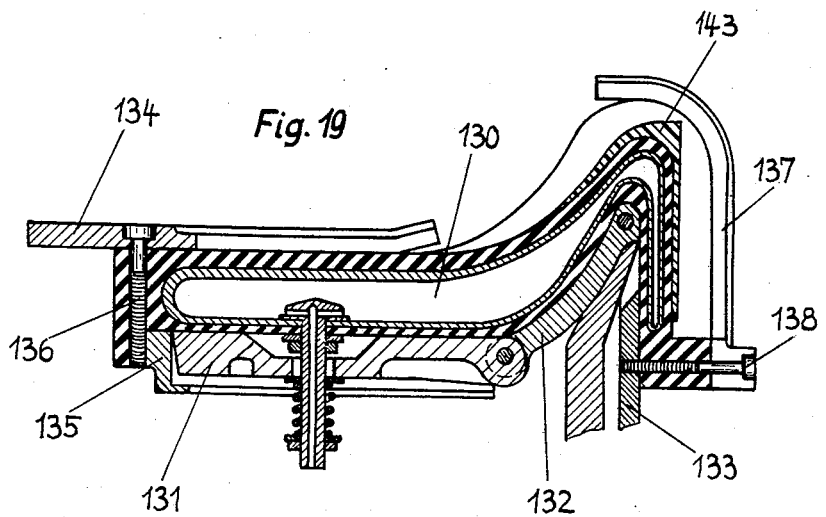
INVENTOR
WERNER LORENZ
BY Dicke, Craig & Treudenberg
ATTORNEYS May 21, 1963 W. LORENZ 3,090,056
PRESSURE PAD ASSEMBLY FOR SHOE PRESS
Filed April 20, 1961 16 Sheets-Sheet 13
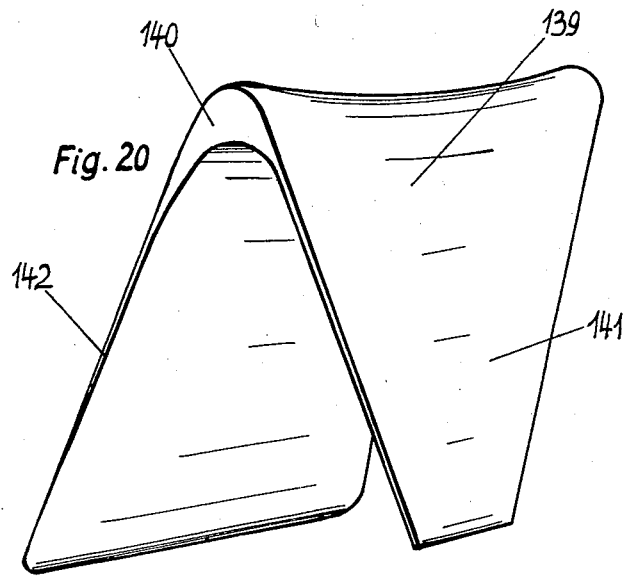
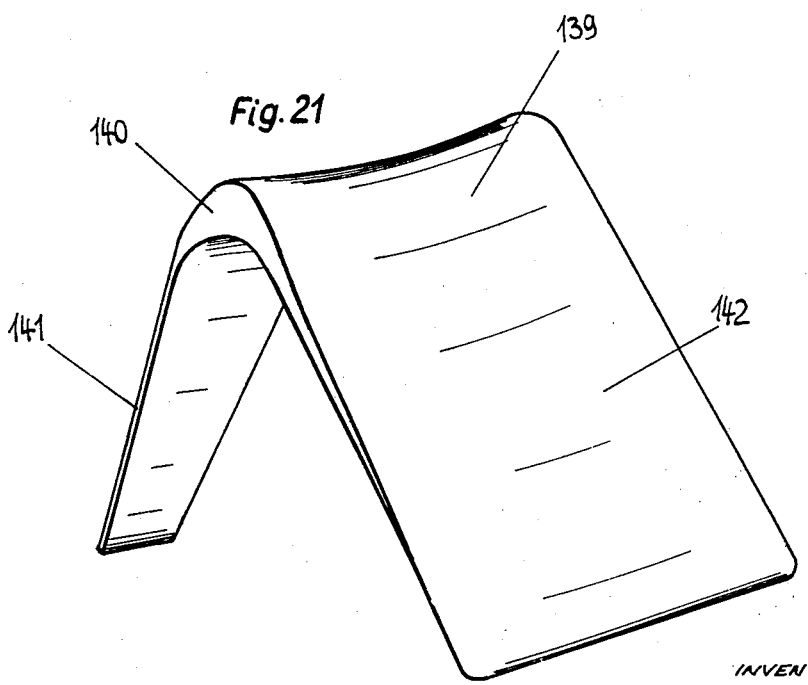
INVENTOR
WERNER LORENZ
BY Dicke, Craig & Freudenberg
ATTORNEYS May 21, 1963 W. LORENZ 3,090,056
PRESSURE PAD ASSEMBLY FOR SHOE PRESS
Filed April 20, 1961 16 Sheets-Sheet 14
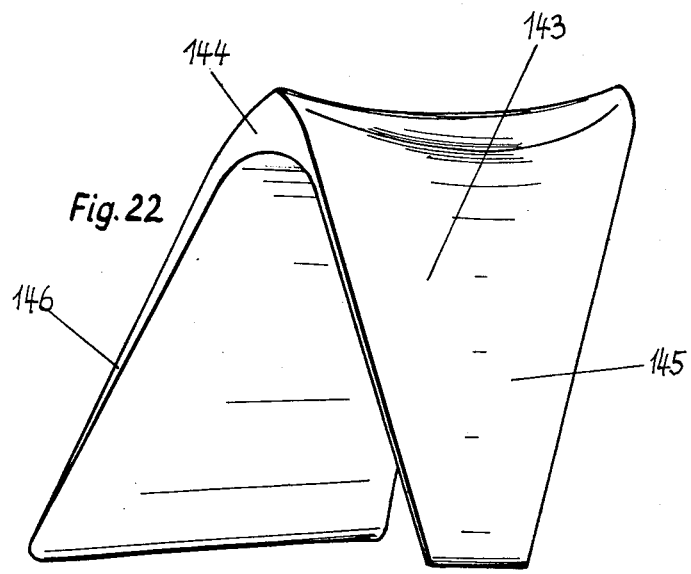
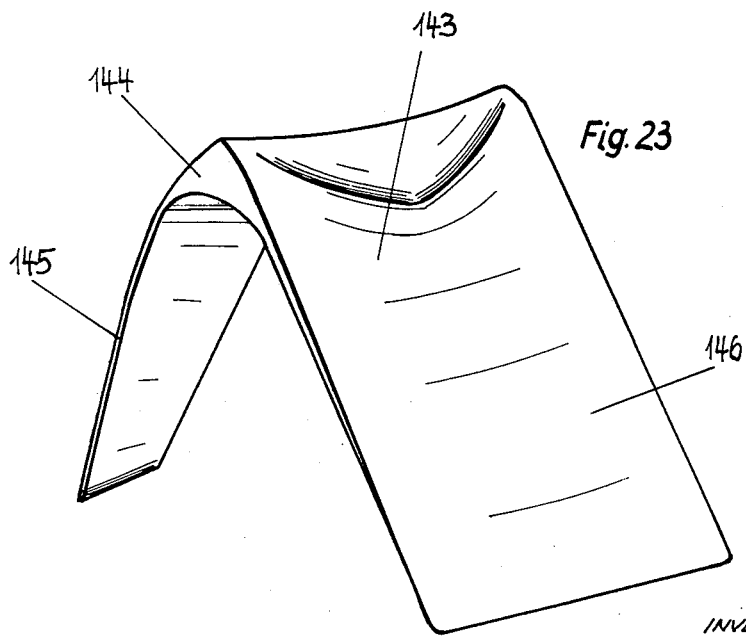
INVENTOR
WERNER LORENZ
ATTORNEYS May 21, 1963 W. LORENZ 3,090,056
PRESSURE PAD ASSEMBLY FOR SHOE PRESS
Filed April 20, 1961 16 Sheets-Sheet 15
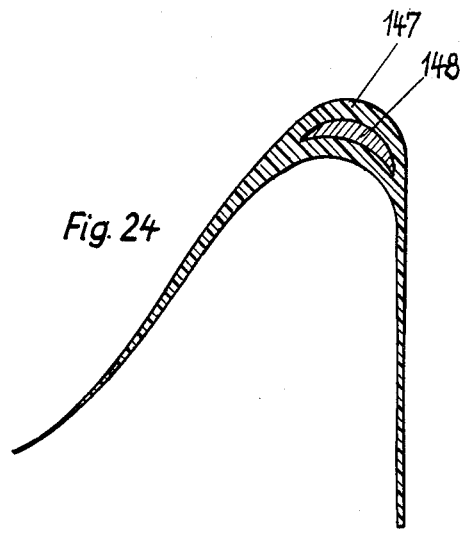
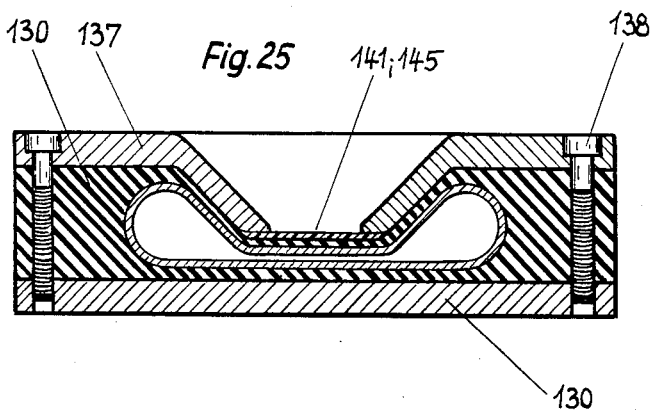
INVENTOR
WERNER LORENZ
BY Dicke, Craig & Freudenberg
ATTORNEYS May 21, 1963 W. LORENZ 3,090,056
PRESSURE PAD ASSEMBLY FOR SHOE PRESS
Filed April 20, 1961 16 Sheets-Sheet 16

INVENTOR
WERNER LORENZ
BY
ATTORNEYS

United States Patent Office 3,090,056
Patented May 21, 1963

3,090,056
PRESSURE PAD ASSEMBLY FOR SHOE PRESS
Werner Lorenz, Alfeld (Leine), Germany, assignor to
Schuhmaschinen-Gesellschaft Hanke & Co. m.b.H.,
Alfeld (Leine), Germany
Filed Apr. 20, 1961, Ser. No. 104,371
Claims priority, application Germany Apr. 22, 1960
21 Claims. (Cl. 12—38)

The present invention relates to shoe presses and more particularly to a pressure pad assembly for such a press for gluing outer soles with or without heel flaps on shoes.

In my copending German patent application published on December 10, 1959, under No. 1,070,963, I have described a pressure pad assembly for gluing soles either with or without heel flaps upon shoes. This pressure pad consists of a flat completely closed bag which is adapted to be inflated and upon which a wedge-shaped member is applied if it is to be used for gluing an outer sole with an attached heel flap upon the bottom of a shoe and the breast of the heel thereof. The pressure pad is also provided with an adjustable member for limiting the effective pad surface and for receiving the slidable and pivotable clamp which supports the back of the heel. Although pressure pads of this type have proved very successful, they have the disadvantage that for gluing soles with attached heel flaps also called heel front faces, upon shoes, it is necessary to apply a different wedge-shaped member for each different shank. A further undesirable feature of such a pressure pad is that the height of the respective wedge-shaped member must be greater than the height of the heel flap, so that the toe portion of the shoe will be pressed into the pressure pad with the result that the shoe might shift in position during the pressing operation.

From the German Patent No. 401,939 it is also known to change the shape of a pressure pad which is intended for gluing three-quarter or full soles upon shoes by folding the end of the pressure pad around an additional shank support in a manner so as to permit a sole and heel flap to be glued by a single operation also upon a shoe on which the heel is already secured. Since such a pressure pad is, however, entirely flat in its original condition, it has when folded over the shank support the tendency to return to its normal position. The insertion of a shoe with a heel already secured thereto is then very difficult and the force required for such insertion between the shank support and the heel support may lead to damage, especially of the covering on the heel.

Another German Patent No. 853,400 discloses a pressure pad for gluing soles either with or without heel flaps upon shoes, and in which the flexible cover sheet of the pad is provided at the rear end of the shank with a sharply creased fold or loop which extends downwardly and transverse to the pressure pad and adapts itself under the downward pressure which is applied upon the shoe to the shape of the shank and heel breast of the shoe. Such pressure pads are, however, of very limited utility since the cover sheet of the pressure pad, creased and folded repeatedly and then subjected to pressure will break or tear within a short time.

It is the principal object of the present invention to provide a pressure pad which overcomes the disadvantages of the pressure pads as described above.

A further object of the invention is to provide a pressure pad which rests upon a braced support and has a front part and a rear part which are disposed within planes which normally extend substantially vertically to each other and in which the angle which is enclosed by these planes is adjustable.

For attaining these objects, the invention consists in providing an inflatable pressure pad of a type known as such, and a support for this pressure pad which consists of three parts which are pivotably connected to each other by means of joints, one of which is disposed in a fixed position, the second of which together with the associated supporting part is slidable along adjustable bracing surfaces, and the third of which is adapted to be adjusted to different pivoted positions and to be secured in any of these positions, and in providing a removable heel brace or heel clamp which is slidable and pivotable to different positions and to be locked therein for working on heeled shoes, and which is exchangeable for a second pressure pad for working on heelless shoes.

The support for the pressure pad is therefore provided according to the invention with three different possibilities of adjustment for gluing soles with heel flaps upon shoes, namely, one adjustment for elevating the front and shank parts of the pressure pad to different positions parallel to each other, another adjustment for elevating the front part of the pressure pad by pivoting it, and a third adjustment for pivoting the heel breast part of the pressure pad.

For bracing the back of a heel, the invention further provides a pneumatic or hydraulic cylinder at an inclined position, the piston rod of which acts upon a pivotable and slidable heel brace which is removably secured to the piston rod. For working on heelless shoes, two inflatable pressure pads are to be used, one of which, that is, the pressure pad which is hereafter called the heel-breast pressure pad for gluing on a sole and a heel flap consists of a suitably premolded closed elastic bag which is provided with reinforcing fabric inserts and is preferably rigidly connected at its heel breast side to the main pressure pad support, while the second pressure pad for gluing on soles without heel flaps and for gluing the heel area of a shoe consists of a flat closed elastic bag which is likewise reinforced by fabric inserts and is rigidly connected to a supporting element which is adapted to be inserted into a bore in the pressure pad support.

In connection with the adjustability of the pressure pad assembly according to the invention it may also be mentioned that it is already disclosed generally by the U.S. Patent No. 2,916,750 to provide adjustable pressure pads and pressure pad supports for gluing soles with heel flaps on shoes. Such adjustable pressure pads have, however, the disadvantage that the adjustment of the front part and of the shank part of the pressure pad is carried out by a single means. Consequently, there is no possibility to adapt the pressure pad accurately to shoes of different kinds and shapes. The front part of the pressure pad is also solidly connected to the main support so that, when the pressure pad is being adjusted, it cannot slide in the longitudinal direction. Furthermore, the pressure pad itself consists of two flat flexible rubber sheets which have to be folded over in accordance with the shape of the pressure pad support. Since the pad is also not reinforced by any fabric inserts or similar means, it will last only for a short length of time.

For gluing a sole and a heel flap upon a shoe in a single operation it is also conventional to use a pressure pad of a shape in its longitudinal direction similar to the shape of the shoe bottom from the front part of the sole to the rear end of the shank at the heel breast. Such a pressure pad consists, for example, of a trough-shaped member, the lateral parts of which are drawn upwardly from the beginning of the shank to the upper curved edge between the shank and the front face of the heel (hereafter called the heel joint), and then steeply downwardly to the front face. An elastic cover is secured to the upper surface of this trough-shaped member by means of a link-shaped clamping frame. Since such a pressure pad is of a rigid shape, it can only be utilized properly for working on shoes of a certain heel height. If shoes are to be glued which have heels of different heights, ranging, for example, from 20 to 120 mm., the elastic cover of the pad will be incapable of compensating such large differences. Consequently, the gluing operation cannot possibly be carried out properly on all shoes. This type of pressure pad has been disclosed, for example, in the French Patent No. 748,834 and the German Patent No. 574,791.

If shoes with heel joints of different shapes or different radii are to be glued, it may occur that the required contact pressure cannot be attained at all points. Although by means of the pressure pad according to the invention as previously described it is possible because of the trough-shaped design of the upper side of the pad at the area of the heel joint to produce a more uniform contact pressure than with a rigid pressure pad of the mentioned type, the heel joint more than any other part of a shoe is subject to considerable changes in style so that at one time this part may have a small radius, at another time a large radius, while at still other times it may even be sharply angular, pointed, or obtuse-angled. The pressure pad alone, however, cannot possibly be adapted to produce a sufficiently uniform contact pressure within the area of the heel joint in compliance with all of these shapes.

It is a further object of the present invention also to overcome the last-mentioned disadvantages. This will be attained according to the invention by the use of different adapters which may be alternately employed and applied upon the mentioned heel joint area intermediate the shank and heel face portions of the pressure pad, and which are designed to increase the contact pressure of the pad against the sole and heel at this area or to adapt the pressure pad to heels and heel joints of different shapes or to achieve both results. Each of these adapters is provided with a lower surface of a shape corresponding to the shape of the upper surface of the pressure pad at the area to be built up, and with an upper surface which corresponds to the shape of the lower surface of the same area of the respective shoe. Each adapter is further preferably provided with a pair of thin tongues or flaps, one of which covers the surface of the pressure pad facing toward the heel front of a shoe, while the other covers the surface of the pressure pad facing toward the shank of the shoe. These tongues or flaps serve the double purpose of forming a smooth, gradual transition of the built-up portion with the shank and flat front portions of the pad and to prevent the adapter from being shifted on the pad.

By providing a series of such adapters of suitable shapes it is possible to modify a single pressure pad to conform exactly to all shoes with different heel joints. The use of these adapters is not limited to an adjustable pressure pad according to the present invention, but they may also be applied to many adjustable or rigid pressure pads according to prior designs.

These and further objects, features, and advantages of the present invention will become more clearly apparent from the following detailed description thereof, particularly when the same is read with reference to the accompanying drawings, in which—

FIGURE 11 shows a plan view of the left pressure pad with the clamping frame thereof;

FIGURE 12 shows a plan view of the right pressure pad with the clamping frame thereof;

FIGURE 16 shows a longitudinal section of a rigid front pressure pad with a rounded heel joint adapter applied thereon;

FIGURE 17 shows a longitudinal section of an adjustable front pressure pad with a rounded heel joint adapter applied thereon;

FIGURE 18 shows a longitudinal section of a rigid front pressure pad with an angular heel joint adapter applied thereon;

FIGURE 19 shows a longitudinal section of an adjustable front pressure pad with an angular heel joint adapter applied thereon;

FIGURE 20 shows a perspective view of a rounded heel joint adapter as seen in the direction toward the face of the heel part thereof;

FIGURE 21 shows a perspective view of the rounded heel joint adapter, as seen in the direction toward the shank side thereof;

FIGURE 22 shows a perspective view of an angular heel joint adapter, as seen in the direction toward the face of the heel part thereof;

FIGURE 23 shows a perspective view of the angular heel joint adapter as seen in the direction toward the shank side thereof;

FIGURE 24 shows a longitudinal section of a rounded heel joint adapter with a core embedded therein;

FIGURE 25 shows a cross section taken along line XXV—XXV of FIGURE 17, in which the heel flap of the heel joint adapter is clamped by the clamping frame;

FIGURE 26 shows a cross section taken along line XXVI—XXVI of FIGURE 17 with a heel flap adapter applied upon the pressure pad; while

Figure 1:
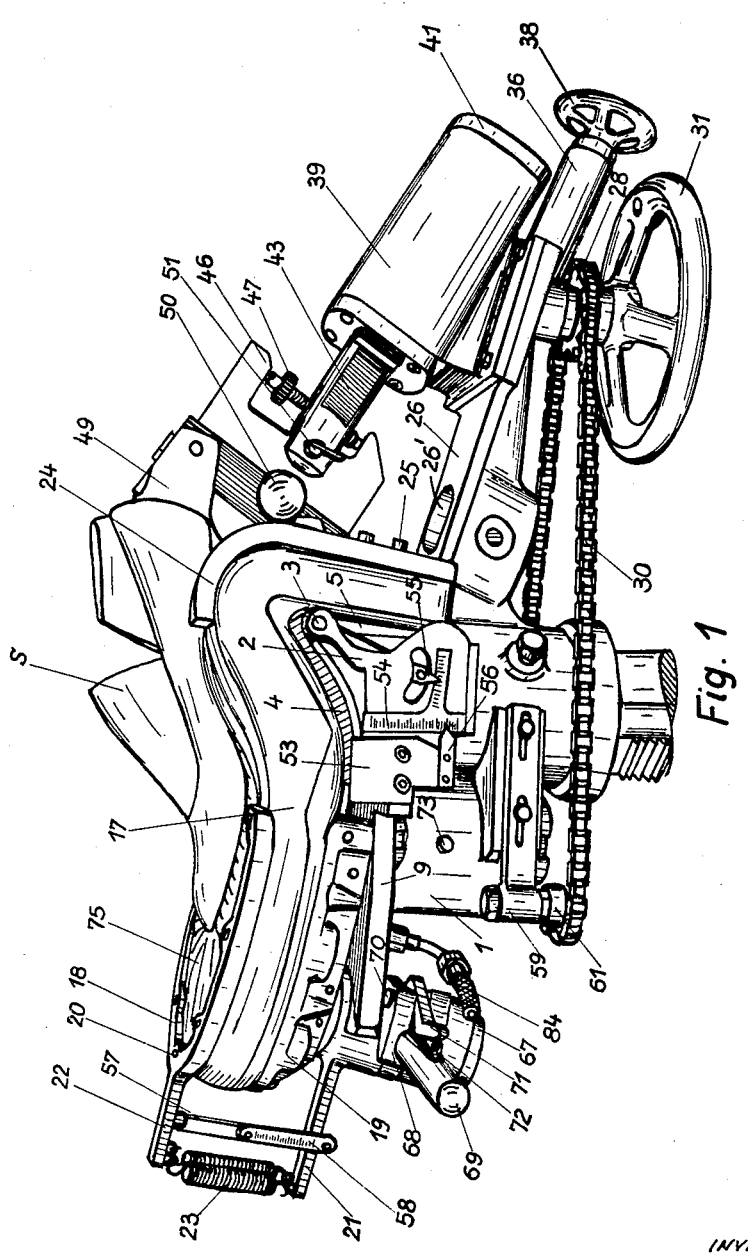
FIGURE 1 shows a perspective general front view of the pressure pad mechanism according to the invention for gluing soles with heel flaps upon shoes.

Referring first particularly to FIGURES 1 to 5 of the drawings, the main supporting element 1 of the apparatus has an upwardly projecting crossarm 2 with a continuous bore therein in which a pivot pin 3 is mounted on which a shank plate 4 and a heel flap plate 5 are pivotably mounted. Shank plate 4 has on its other end a bore which contains a pivot pin 7 on which a bottom plate 6 is pivotably mounted.

The main supporting element 1 has a larger bore in which a column 8 forming a gear rack is slidably mounted which has an its upper end a supporting plate 9 on which an eye portion 10 of bottom plate 6 containing pivot pin 7 engages. At the side opposite to eye portion 10, bottom plate 6 has an end portion 11 on which a setscrew 12 engages which is threaded into an extension 13 of supporting plate 9.

Supporting element 1 also contains a bearing for a worm shaft 14 which is supported at the lower side by a bearing cover 15 which is secured by screws 16. The worm on shaft 14 is in mesh with the rack on column 8.

A front and heel flap pressure pad 17 which will be later described in detail rests with its lower side on the hinged plate 4, the heel flap plate 5, and the bottom plate 6, and while resting loosely on hinge plate 4 and bottom plate 6, it is secured to the heel flap plate 5 by means of a clamping frame 24 and screws 25. At its front part, pressure pad 17 is removably secured by means of screws 20 to a pair of horseshoelike clamping frames 18 and 19 in order to produce a flat shoe bottom. For limiting the yieldability of the front part of pressure pad 17 in the vertical direction, the lower horseshoelike clamping frame 19 has an inwardly bent collar which surrounds the bottom plate 6 and has an inner height slightly larger than the height of bottom plate 6 so that the pressure pad can only yield in the vertical direction to the extent of the difference between the two heights.

Supporting plate 9 has an extension 21, and clamping frame 18 has an extension 22. These two extensions are connected by a tension spring 23 which tends to draw the front part of the pressure pad together with bottom plate 6 toward setscrew 12.

Supporting element 1 further comprises an arm or bracket 26 which carries a stationary bolt 27 on which a sprocket wheel 28 is freely rotatable which is connected by a chain 30 to a further sprocket wheel 29 on worm shaft 14 and then runs over a third sprocket wheel 61 which is rotatable on a stationary pin 60 on an adjustable bearing member 59 and serves for tightening chain 30. Sprocket wheel 28 is rigidly connected, for example, splined to a handwheel 31, although in place of the latter a servo-motor or the like may be provided.

If handwheel 31 is turned in one or the other direction, chain 30 turns worm shaft 14 accordingly, whereby column 8 together with supporting plate 9 is moved upwardly or downwardly. Since bottom plate 6 rests at one end on supporting plate 9 by means of its eye 10 and at the other end 11 on setscrew 12, the raising or lowering movement of column 8 and supporting plate 9 is also transmitted to the pressure pad 17. Eye 10 and the end portion 11 of bottom plate 6 then slide along supporting plate 9 and the tip of setscrew 12 in accordance with the degree of inclination to which bottom plate 6 has been set by setscrew 12 so that pressure pad 17 while being raised or lowered will remain parallel and be thus compressed or released at the shank area.

The heel flap plate 5 carries a bracket 32 on which a strap 33 is pivotably mounted, the other end of which is pivotably connected to a bifurcated head 34 which is secured to a screw socket 35. This socket 35 is slidably guided in a bushing 36 into which a spindle 37 is screwed which is provided with a handwheel 38. If this handwheel 38 is turned, socket 35 will be moved in the axial direction, whereby—through members 33 and 32—the heel front plate 5 will be pivoted about pivot pin 3. Since plate 5 is rigidly secured to pressure pad 17, the latter will be pivoted likewise.

Bracket 26 carries on its outer end a heel bracing cylinder 39 which contains a guide bushing 40 in which a piston rod 43 with a piston packing ring 44 thereon is slidably mounted. At the other side of cylinder 39, the same is closed by a cap 41 with an air inlet nipple 42 thereon. In the particular embodiment as illustrated, the reverse movement of piston rod 43 is effected by a compression spring 45, although the piston may also be acted upon from both sides either by compressed air or by a hydraulic medium.

The front end of piston rod 43 is bifurcated and has a guide member 46 pivotably connected thereto by means of a removable pin 51. Piston rod 43 is further provided with a tapped crossbore into which a setscrew 47 is screwed, the ends of which engage upon a pair of opposite projections on guide member 46. By adjusting setscrew 47 it is possible to pivot guide member 46 to different angles relative to piston rod 43. Guide member 46 is provided with a slideway on which a slide member 48 is movable to different positions in which it may be clamped in a fixed position by a setscrew 50. Slide member 48 carries a pressure member 49 of an elastic material and of a shape in accordance with the shape of the back of the particular shoe heel to be worked upon.

Figure 7:
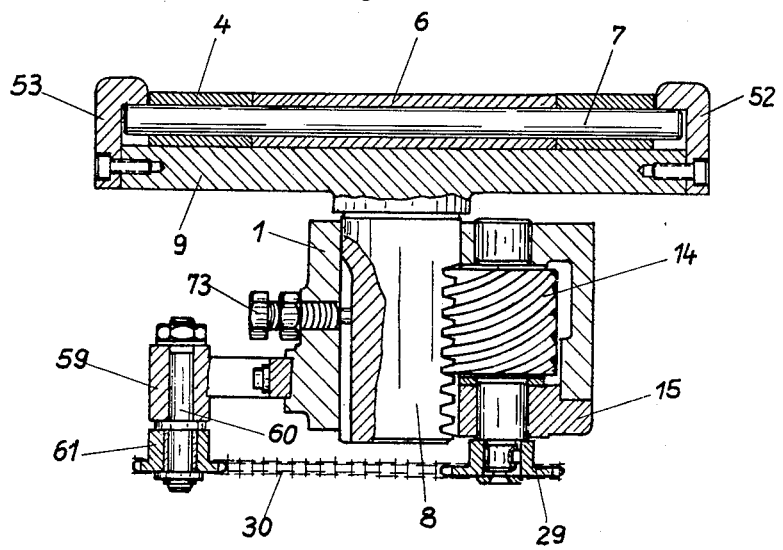
FIGURE 7 shows a partial cross section of the elevation adjustment device taken along line VII—VII of FIGURE 4.

In order to prevent pressure pad 17 from being lifted off its supporting surfaces when it is being adjusted by column 8, the supporting plate 9 is provided with angle pieces 52 and 53, as shown particularly in FIGURE 7, which extend over the ends of pivot pin 7 on which bottom plate 6 is mounted.

For noticeably indicating the particular position of the pressure pad, each of the three points of adjustment is provided with a pointer and a scale. Thus, the adjustment of the heel flap portion is indicated by a pointer 55 on a scale 54 and the parallel elevation adjustment by a pointer 56 on the adjacent scale 54, while the position of the toe portion may be read on a scale 58 which is mounted on a rod 57.

Figure 2:
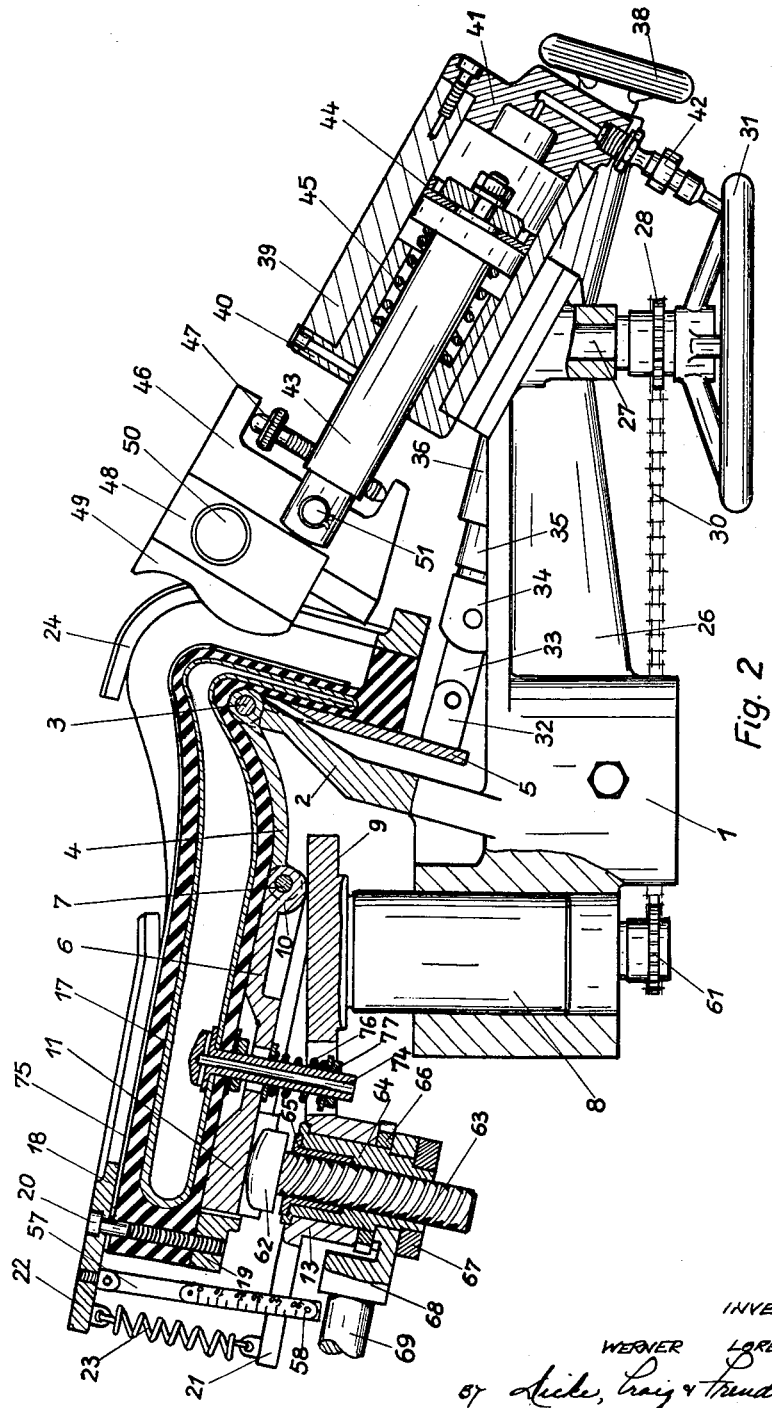
FIGURE 2 shows a front view of the mechanism according to FIGURE 1 partly in a cross section taken along the longitudinal axis of the pressure pad and equipped for gluing soles with heel flaps upon shoes with a low heel height.
Figure 3:
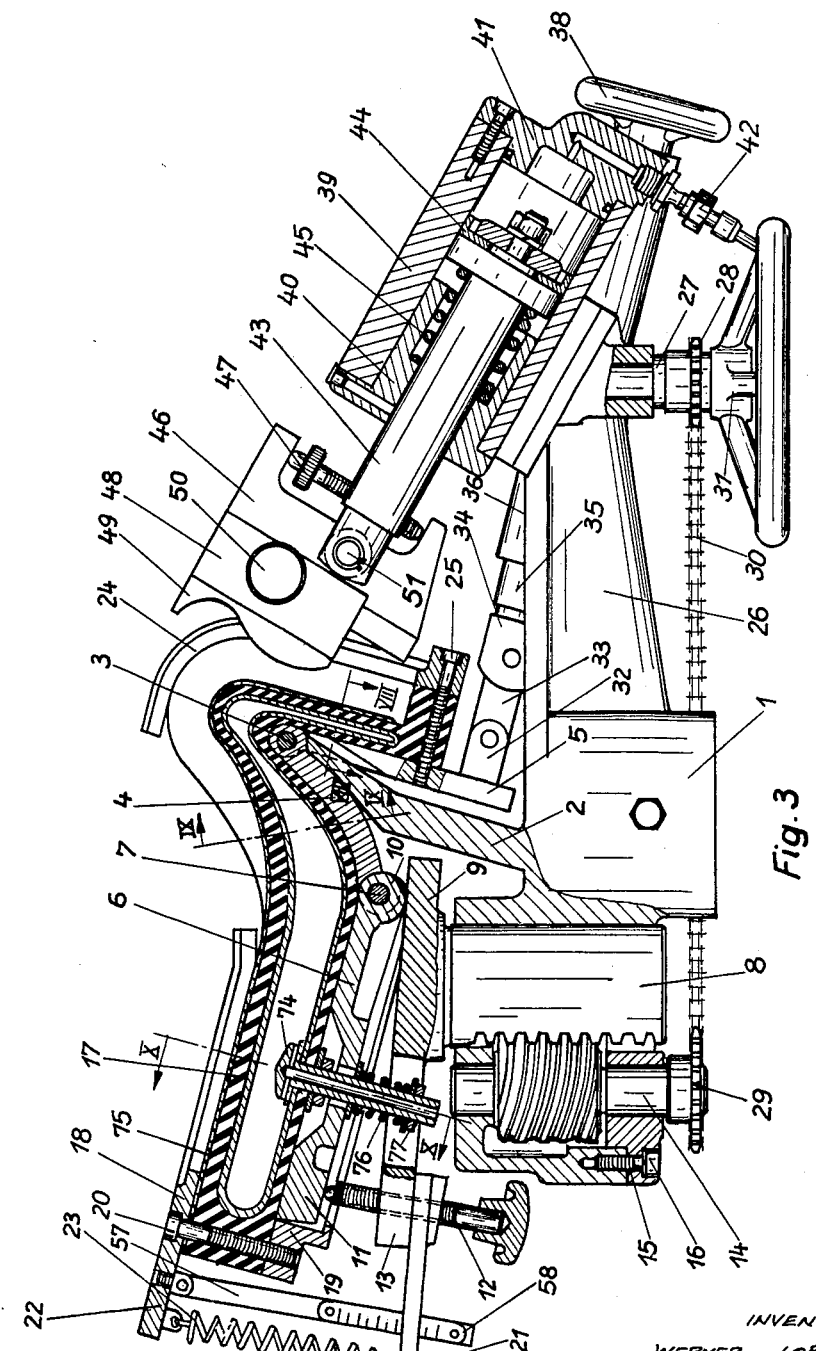
FIGURE 3 shows a similar view of the mechanism, but equipped for gluing soles with heel flaps upon shoes with high heels.
Figure 6:
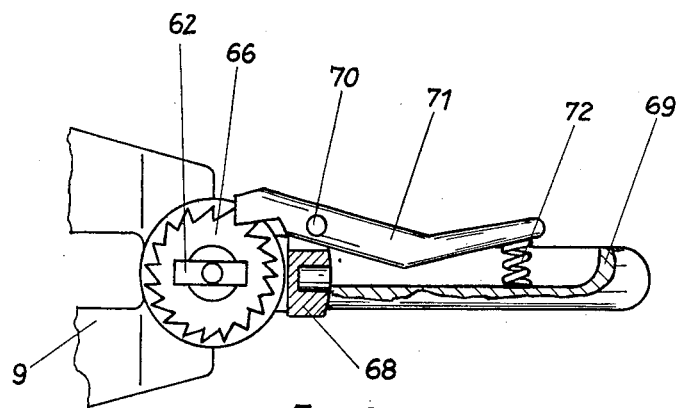
FIGURE 6 shows a view of the quick-adjusting device, as seen in the direction of the arrows VI—VI of FIGURE 4.

Since the bottom plate 6 must be frequently readjusted in accordance with different shoe designs and heel heights, it is advisable to effect these adjustments not by a simple setscrew, but by a quick-setting device, for example, of the type as illustrated in FIGURES 2 and 6. This device consists of a coarse-threaded spindle 63 which has a head 62 rotatably secured thereto which engages into an elongated recess in the lower side of the front end 11 of bottom plate 6. The extension 13 of supporting plate 9 has a tubular projection which has a guide bushing 64 rotatably mounted therein. This guide bushing, in turn, contains a threaded bushing 65 into which spindle 63 is screwed. The lower end of the tubular part on extension 13 carries a ratchet wheel 66 which is rigidly connected thereto by pins. Guide bushing 64 also carries a control member 68 which is clamped by a nut 67 against a shoulder on guide bushing 64 and is secured to a handle 69. Control member 68 also carries a pawl 71 which is pivotably mounted thereon by a pin 70 and is pressed by a spring 72 into constant engagement with the teeth of ratchet wheel 66.

In order to prevent the supporting plate 9 from turning when it is raised or lowered by worm shaft 14, the supporting element 1 is provided with a trunnion screw 73 which engages into a longitudinal groove in the outer surface of column 8, as shown particularly in FIGURE 7.

Near its front end, pressure pad 17 is provided with a valve tube 74 for inflating the pressure pad with the respective pressure medium. Since the pressure pad is yieldable to some extent in the vertical direction, it is protected from being damaged by providing the valve tube 74 with a compression spring 76 which engages on a nut 77 on the threaded stem of tube 74. A hose for supplying the pressure medium may be connected to the end of tube 74 by a cap nut.

Figure 14:
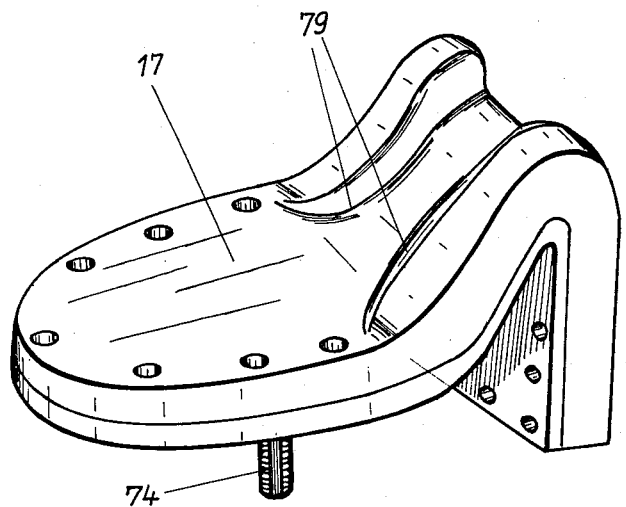
FIGURE 14 shows a perspective view of the front and heel flap pressure pad as seen in the direction toward the bottom and shank parts.
Figure 15:
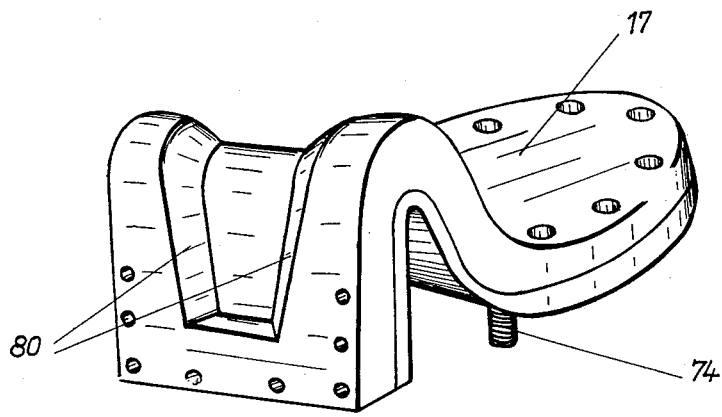
FIGURE 15 shows a perspective view of the pressure pad according to FIGURE 14 as seen in the direction toward the heel flap part.

For protecting the side of pressure pad 17 which faces toward the shoe bottom, a protective cover 75 is provided thereon. The pressure pad consists of a completely closed bag, preferably of rubber or a similar elastic material, with fabric reinforcements embedded therein. Pressure pad 17 itself is produced by molding and it has an outer shape as illustrated in FIGURES 14 and 15, while its cross-sectional shape at different points of its length may be seen in FIGURES 8 to 10 and its shape in a central longitudinal section in FIGURES 2 to 5. The important feature of pressure pad 17 is that it has a substantially flat surface at the front part within the area which is adapted to receive the shoe bottom and is also supported by the two clamping frames 18 and 19, and that for attaining a smoothly rounded and tightly fitting shank portion the pressure pad is made of a trough-shaped form from the beginning of the shank portion toward the heel. In order to insure still further that the front part of the pressure pad will always remain flat, this part is reinforced by strong inserts 78, preferably of fabric, as shown particularly in FIGURE 10.

Figure 8:
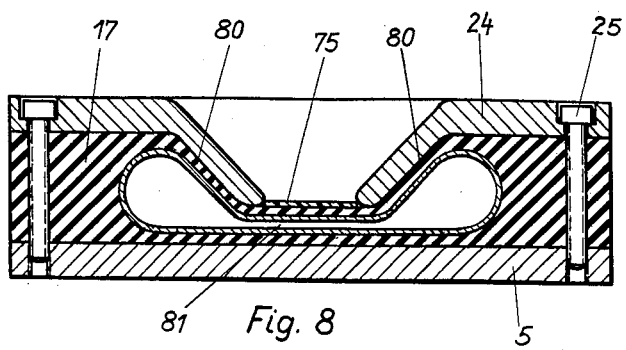
FIGURE 8 shows a cross section of the pressure pad taken along line VIII—VIII of FIGURE 3.
Figure 9:
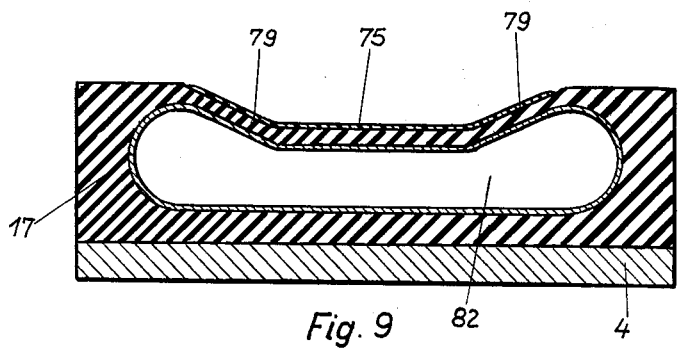
FIGURE 9 shows a partial cross section of the pressure pad taken along line IX—IX of FIGURE 3.

FIGURE 9 illustrates the trough shape of the pressure pad within the area of the shank. When comparing FIGURE 9 with FIGURE 8 it will be seen that the sides 79 taper gradually to the height of sides 80. From its highest point, that is, from the curved edge of the heel face downwardly to the lower end of the heel face, the pad chamber for the pressure medium is made very narrow, as shown in FIGURE 8 at 81, in order to permit also shoes with the highest possible shank and with a heel flap to be worked on.

Figure 10:
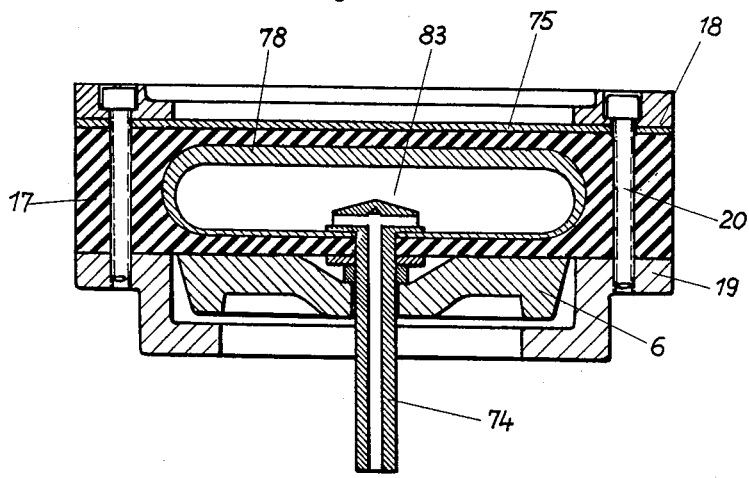
FIGURE 10 shows a partial cross section of the pressure pad taken along line X—X of FIGURE 3.

At the main part of the pad chamber as indicated at 82 in FIGURE 9 and at 83 in FIGURE 10, the chamber is made much larger. The upper side of the pressure pad according to FIGURE 9 is made considerably more elastic than the upper side according to FIGURE 10 so as to insure that the shoe to be worked on will be well embedded within the pad. For preventing the pad from expanding excessively within the area of the heel face, the inclined sides 80 thereof will be held down by a clamping frame 24 which is shaped accordingly.

Figure 4:
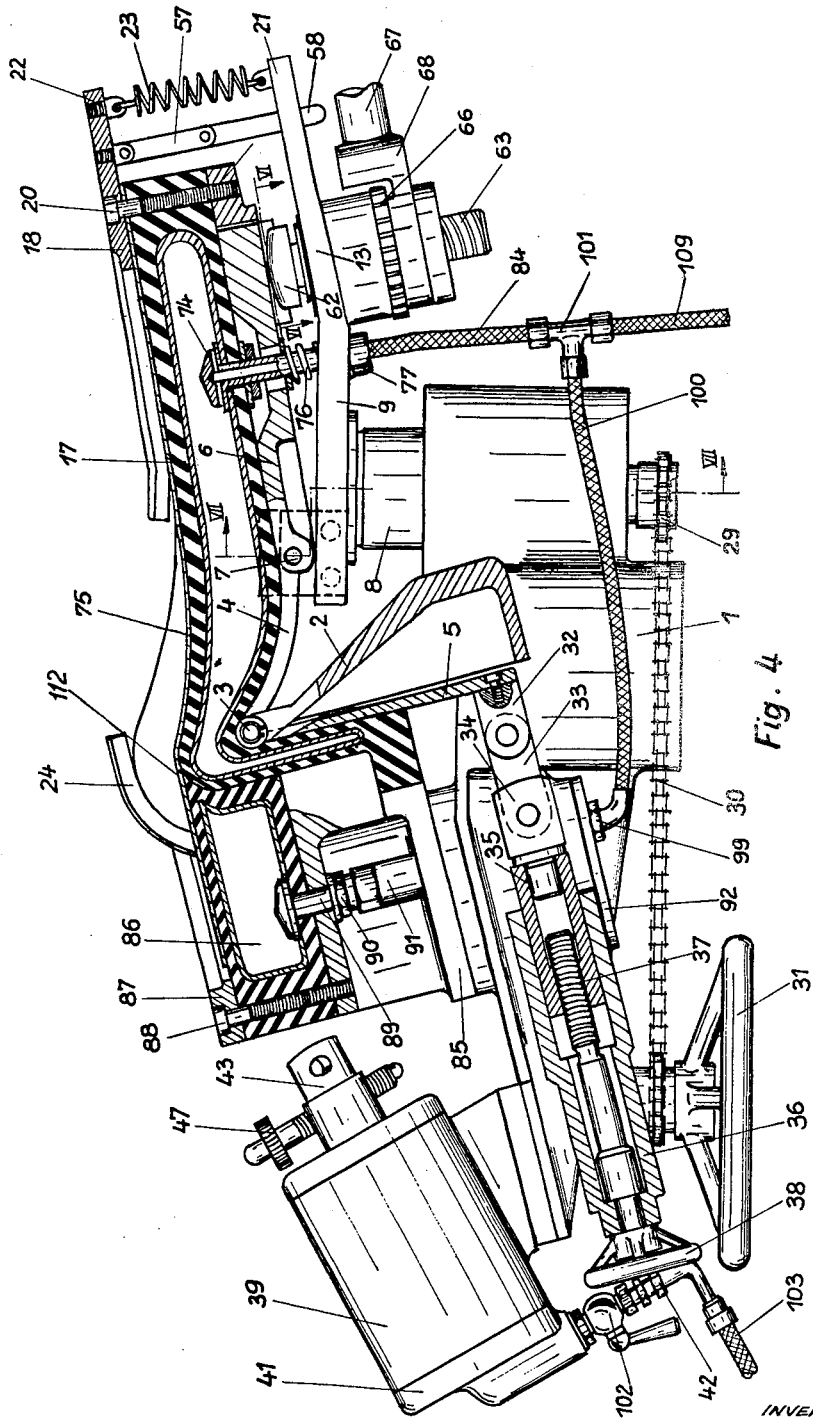
FIGURE 4 shows a similar rear view of the mechanism, but equipped for gluing soles without heel flaps and for also gluing the heel portion of the shoe.
Figure 5:
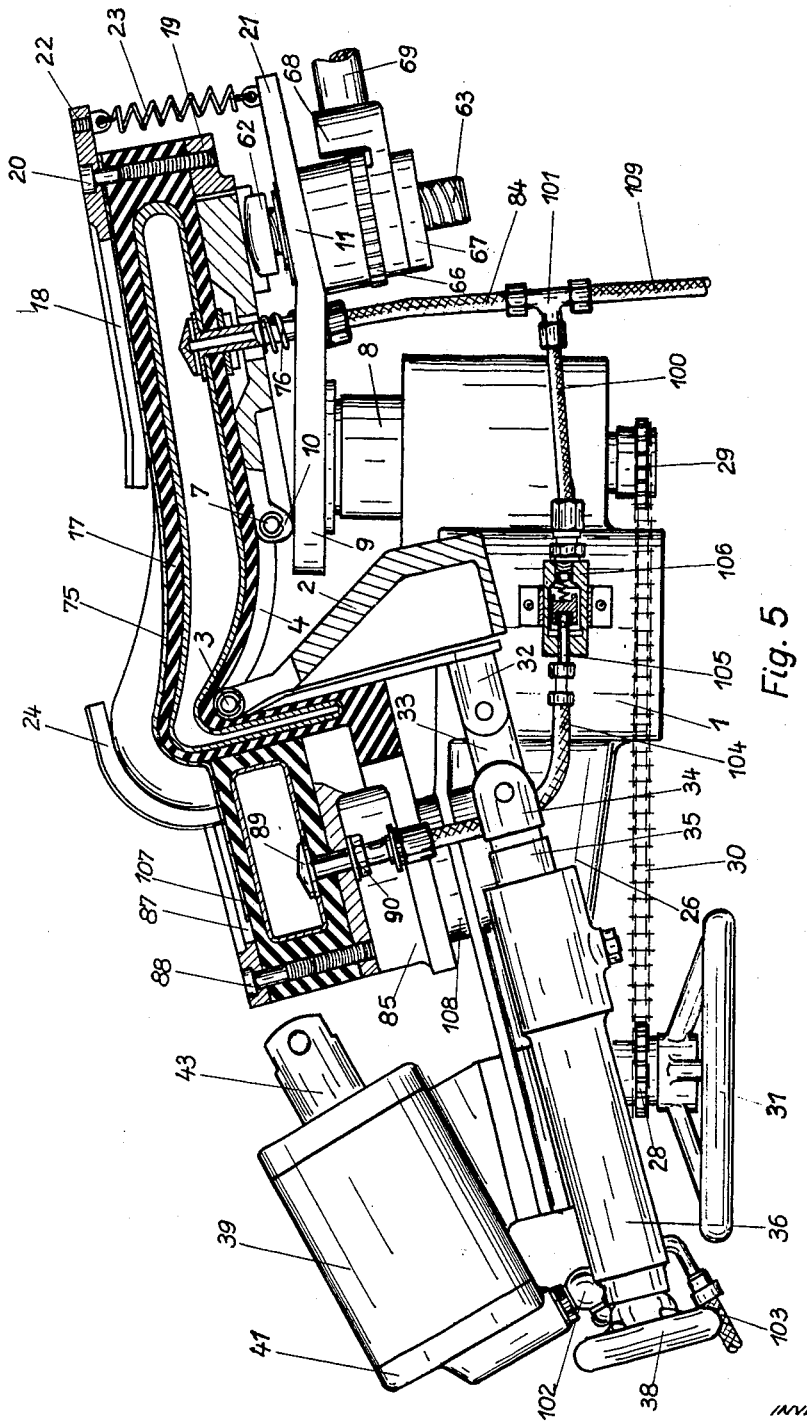
FIGURE 5 shows a similar rear view of the mechanism equipped for gluing soles with a heel flap and for also gluing the tread surface of the shoe heel.
Figure 13:
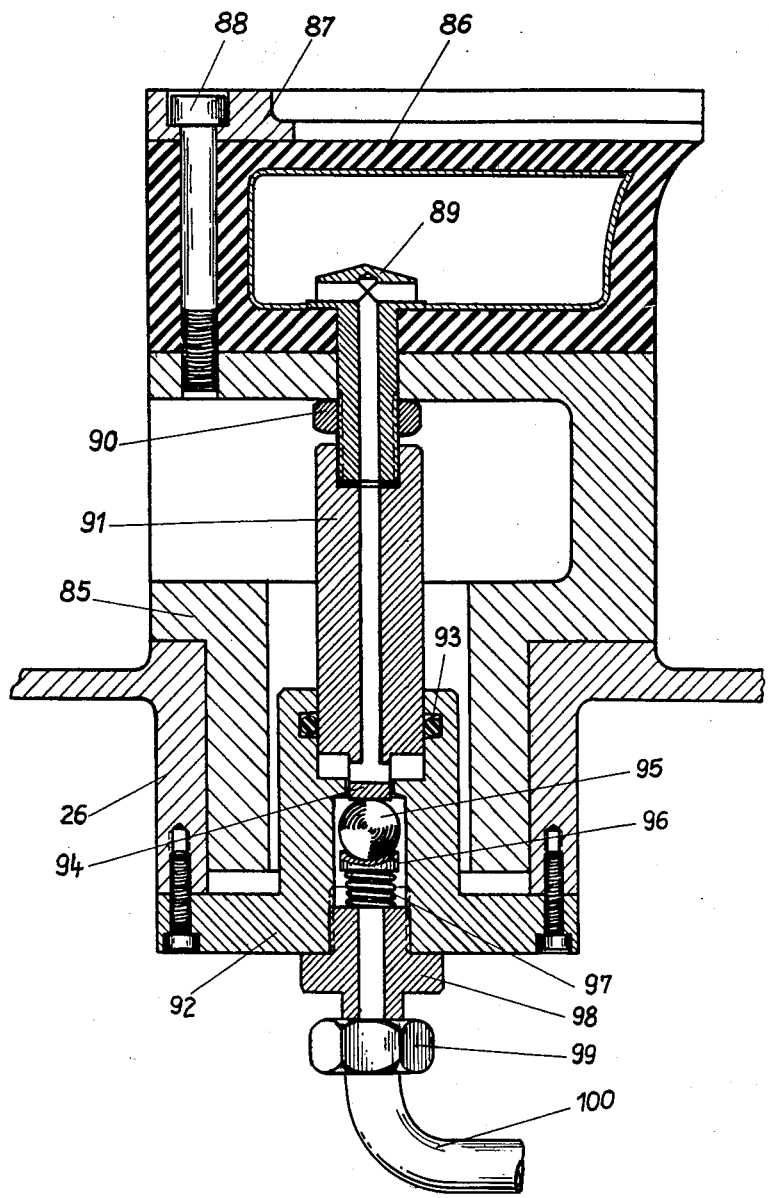
FIGURE 13 shows a cross section of the heel pressure pad.

For gluing on soles without heel flaps, guide member 46 together with the parts connected thereto may be removed by pulling the pin 51 out of the end of piston rod 43. Valve 102 of the heel bracing cylinder 39 as shown particularly in FIGURE 4, is then closed so that this cylinder will be inoperative. A supporting member 85, as shown in FIGURES 4, 5, and 13, which carries a heel pressure pad 86 is then inserted into a bore 26' in bracket 26, as shown in FIGURE 1, and is secured therein by a setscrew. This heel pressure pad 86 is provided with a horseshoe-shaped frame 87 which together with the pressure pad is secured to the supporting member 85 by screws 88. A valve tube 89 which terminates into pressure pad 86 and is tightly screwed by a nut 90 to supporting member 85 also secures the pressure pad additionally to the supporting member. On the lower end of valve tube 89 an extension tube 91 is screwed which has on its lower end a projecting pin 94 and it fits slidably into a socket on a cover 92 which is secured by screws to bracket 26. When the reduced part of supporting member 85 is fully inserted into bore 26' in bracket 26, pin 94 on the extension tube 91 depresses a ball 95 on a valve cup 96 into a valve chamber in cover 92 against the action of a compression spring 97, so that the valve will be opened to allow the pressure medium to pass from conduit 100 into pressure pad 86. A gasket 93 seals the wall of extension tube 91 relative to cover 92 to prevent the escape of any pressure medium.

The heel pressure pad 86, as shown in FIGURES 4 and 13 may be inserted for gluing on soles without heel flaps and for also gluing the heel portion. For this purpose, pressure pad 86 has a forwardly projecting nose 112 for attaining a smooth connection to the main pressure pad 17. Heel pressure pad 86 is likewise produced by molding and also has fabric reinforcements embedded therein.

The heel-pressure pad 107, as shown in FIGURE 5, serves together with the front pressure pad 17 for gluing a heel flap as well as a heel tread surface upon the sole of a shoe. Otherwise, the construction of this heel pressure pad is the same as that described with reference to FIGURES 4 and 13. For adapting the pad supporting member 107 to different heel heights, the same is provided with a trunnion 108 which is slidable in bore 26' of bracket 26 and adapted to be clamped therein in the adjusted position. Because of this adjustability, valve tube 89 of this pressure pad 107 is also not connected to an extension tube 91 but with a hose line 104 which terminates in a plug nipple 105 which may be tightly inserted into a valve socket 106. The pressure medium is supplied to both pressure pads 17 and 107 through a hose line 109 and is branched off to lines 84 and 100 through a T fitting 101. If the work is to be carried out on an apparatus according to FIGURE 4 or 5, only by means of the front pressure pad 17 while the heel pressure pad 86 or 107 is removed, the supply of pressure medium is automatically shut off by valve 95 or valve socket 106, respectively.

Since the heel face of a shoe does not extend exactly at a right angle to the longitudinal axis of the shoe, the front clamping frames 18 are made of different shapes for left and right shoes, as indicated by numerals 110 and 111 in FIGURES 11 and 12, respectively.

The rigid front pressure pad as illustrated in FIGURES 16 and 18 consists of a trough-shaped member 120, the lateral parts 121 of which are drawn upwardly from the beginning of the shank to the curved edge of the heel joint from which they descend steeply toward the face of the heel portion. On the upper surface of the trough-shaped member 120 a pressure pad cover 122 and a further protective cover 123 are secured by means of a frame consisting of several parts 124, 125, 126, 127, and 128 and by screws 129 so that a closed chamber is formed between this cover 122 and the bottom of member 120.

The adjustable front pressure pad according to FIGURES 17 and 19 consists of a pressure pad bag 130 which is produced by molding and is resting upon a pad support which consists of several parts 131, 132, and 133 but is rigidly secured only to the supporting part 133. Within the area of its front part the pressure pad bag 130 is enclosed by a pair of horseshoe-shaped frames 134 and 135, which are secured to each other by screws 136 which also pass through the edge of bag 130. At the rear part, bag 130 is secured to the pad support 133 by means of a frame 137 and screws 138. The means for adjusting the pressure pad support or the pressure pad bag are shown in FIGURES 1 to 7 and are therefore not particularly illustrated in FIGURES 17 and 19.

The front pressure pad according to either FIGURE 16 or FIGURE 17 has a molded adapter 139 for a rounded heel joint applied to the outer surface thereof. As shown in FIGURES 20 and 21, it consists of a thicker profiled part 140 with an inner surface of a radius in accordance with the shape of the heels to be applied. This thicker adapter part 140 merges at both sides thereof into a pair of flaps 141 and 142, the first of which covers the heel face side and the latter the shank side of the pressure pad. Flap 142 covering the shank side of the pressure pad is chamfered along both sides and at the free end so that the molded member 139 will merge smoothly and gradually with the surface of the pressure pad.

The pressure pad according to either FIGURE 18 or FIGURE 19 has a molded adapter 143 for an angular heel joint applied to the outer surface thereof. As shown in FIGURES 22 and 23, it consists likewise of a thick profiled part 144 with an inner surface of a radius in accordance with the shape of the pressure pad and an outer surface of an angular shape in accordance with the shape of the heels to be applied. Also in this case the thicker part 144 merges at both sides thereof into a pair of flaps 145 and 146, the first of which covers the heel face side and the latter the shank side of the pressure pad. Flap 146 covering the shank side is likewise chamfered along both sides and at the lower end so that the adapter 143 will merge smoothly with the surface of the pressure pad.

Although the entire adapter 139 or 143 including the thick part 140 or 144 and the extensions 141 and 142 or 145 and 146 may be molded of one piece of material, flaps 141 and 142 or 145 and 146 may also be made separately from the thick part 140 or 144 and they may be secured thereto by gluing, vulcanizing, or the like.

Figure 27:
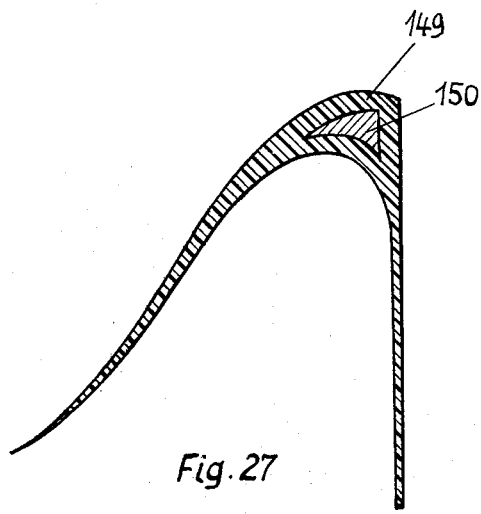
FIGURE 27 shows a longitudinal section of an angular heel joint adapter which, similar to FIGURE 24, has a core embedded therein.

In order to be able to increase the pressure especially within the area of the heel joint, a reinforcement 148 or 150 of a hard material, for example, metal, may be embedded in each adapter 147 and 149, as shown in FIGURES 24 and 27, respectively. The adapters themselves, including their two flaps, preferably consist of rubber or a suitable plastic, for example, of the plastic sold under the German trade name of "Vulcollan." It is, however, also possible to make the flaps of Vulcollan and the thicker molded part of rubber, or vice versa.

The respective adapter 139, 143, 147, or 149 may be loosely applied upon the pressure pad since it will be held securely in place by the two flaps at the shank and heel face. It is, however, also possible to connect the respective adapter to the pressure pad or to the frame of the pad so as to be quickly removable therefrom. This may be done, for example, in accordance with FIGURE 25 which shows flap 141 or 145 for the heel face clamped into the clamping frame 137.

Figure 26:
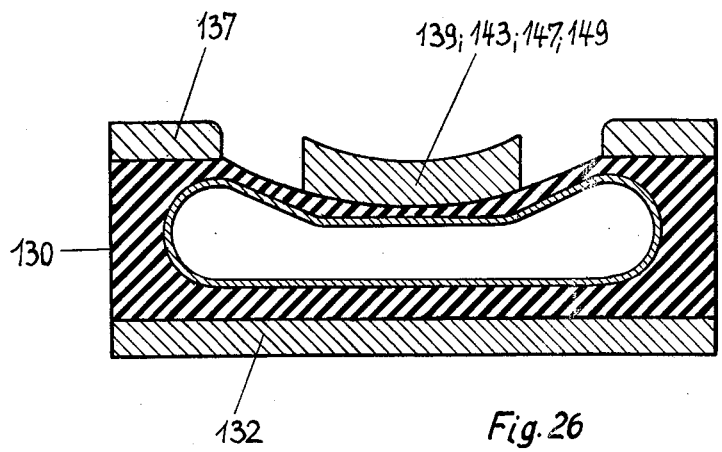

FIGURE 26 indicates diagrammatically that the area of the heel joint of the respective adapter 139, 143, 147, or 149 has a slightly concave shape in accordance with the shape of the heel.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a shoe press, a pressure pad assembly for gluing soles upon shoes, comprising a pressure pad having a front part and a rear part normally disposed substantially at right angles to each other, means for inflating said pad, means for supporting said pad including three parts, joints for pivotably connecting said parts to each other, means for bracing said supporting means, one of said joints being mounted in a fixed position, a second joint together with an associated supporting part being slidable on and in engagement with said bracing means, means for pivoting the supporting part associated with the rear part of said pressure pad to different positions and for locking the same in any of said positions, heel bracing means associated with said pad for working on heeled shoes, and means for sliding and pivoting said heel bracing means to different positions and for locking the same in any of said positions.

2. A pressure pad assembly as defined in claim 1, in which said pad comprises a closed bag of elastic material and fabric inserts for reinforcing said bag, and means for removably securing said bag to only one of said three parts.

3. A pressure pad assembly as defined in claim 1, further comprising means for permitting said pressure pad to yield only to a limited extent in a substantially vertical direction.

4. A pressure pad assembly as defined in claim 1, wherein said bracing means includes a shaft, a worm on said shaft, and a gear rack engaging with said worm for adjusting the elevation of said second joint.

5. A pressure pad assembly as defined in claim 4, further comprising a chain drive for rotating said shaft and the worm thereon, and means for operating said chain drive.

6. A pressure pad assembly as defined in claim 1, in which one of said supporting parts supports the front end of said pad, wherein said bracing means includes means associated with the free end of said front supporting part, and quick-setting means including a ratchet wheel for adjusting said bracing means of said front supporting part in elevation.

7. A pressure pad assembly as defined in claim 1, further comprising means for indicating the respective position of each of said three supporting parts, and wherein the front part of said pressure pad between the beginning of the shank portion and the heel face portion thereof is of a troughlike shape.

8. A pressure pad assembly as defined in claim 1, in which the wall thickness of said pressure pad varies at different points thereof.

9. A pressure pad assembly as defined in claim 1, further comprising a readily removable adapter for being applied upon the heel joint area of said pressure pad for increasing the contact pressure of said area of said pad against a shoe, the lower surface of said adapter corresponding in shape to the same area of the upper surface of said pressure pad, and the upper surface of said adapter corresponding in shape to the same area of the lower surface of one of the shoes to be worked on.

10. A pressure pad assembly as defined in claim 1, further comprising an adapter for being applied upon the heel joint area of said pressure pad for adapting said area to the shapes of different kinds of heels, the lower surface of said adapter corresponding in shape to the same area of the upper surface of said pressure pad, and the upper surface of said adapter corresponding in shape to the same area of the lower surface of one of the shoes to be worked on.

11. A pressure pad assembly as defined in claim 10, in which said adapter has a pair of thin flaps thereon, one of said flaps being adapted to cover the surface of said pressure pad facing toward the heel face of a shoe, the other flap being adapted to cover the surface of said pressure pad facing toward the shank of the shoe.

12. A pressure pad assembly as defined in claim 11, in which said flap for covering the surface of said pressure pad facing toward the shank of a shoe is chamfered toward its free end.

13. A pressure pad assembly as defined in claim 11, in which each of said flaps consists of one piece and is secured to the adapter itself.

14. A pressure pad assembly as defined in claim 11, in which said adapter including said flaps consists of one molded piece.

15. A pressure pad assembly as defined in claim 11, in which said adapter including its flaps consists of an elastic material.

16. A pressure pad assembly as defined in claim 11, in which said adapter including its flaps consists of rubber.

17. A pressure pad assembly as defined in claim 11, in which said adapter including its flaps consists of plastic.

18. A pressure pad assembly as defined in claim 11, in which said adapter is curved at its highest point between said two flaps thereof.

19. A pressure pad assembly as defined in claim 11, in which said adapter has a sharp corner at its highest point between said two flaps thereof.

20. A pressure pad assembly as defined in claim 11, in which said adapter is adapted to be quickly applied upon and removed from said pressure pad.

21. A pressure pad assembly comprising an inflatable pressure pad having a front part and a rear part normally disposed substantially at right angles to each other, means for inflating said pad, means for supporting said pad including three ports, joints for pivotably connecting adjacent ones of said parts to each other, means for bracing said supporting means, one of said joints being mounted in a relatively fixed position, a second joint together with at least one of said three parts being slidable on and in engagement with two supporting surfaces, each of said supporting surfaces being independently raisable and lowerable, means for pivoting the supporting part associated with the rear part of said pressure pad to different positions and for locking same in any of said positions, heel bracing means associated with said pad for working on heeled shoes, and means for adjusting the position of said heel bracing means.

References Cited in the file of this patent

UNITED STATES PATENTS

| | | |
|---|---|---|
| 2,914,782 | Prahl et al. | Dec. 1, 1959 |
| 2,916,750 | Ralphs et al. | Dec. 15, 1959 |
| 2,962,736 | Marasco | Dec. 6, 1960 |

FOREIGN PATENTS

| | | |
|---|---|---|
| 1,161,999 | France | Dec. 6, 1956 |